United States Patent [19]

Winter et al.

[11] Patent Number: 5,232,993

[45] Date of Patent: Aug. 3, 1993

[54] PROCESS FOR THE PREPARATION OF A POLYPROPYLENE MOLDING COMPOSITION

[75] Inventors: Andreas Winter; Volker Dolle, both of Kelkheim; Jürgen Rohrmann; Walter Spaleck, both of Liederbach; Martin Antberg, Hofheim am Taunus, all of Fed. Rep. of Germany

[73] Assignee: Hoechst AG, Frankfurt, Fed. Rep. of Germany

[21] Appl. No.: 630,262

[22] Filed: Dec. 19, 1990

[30] Foreign Application Priority Data

Dec. 21, 1989 [DE] Fed. Rep. of Germany ....... 3942365

[51] Int. Cl.⁵ .......................................... C08F 297/08
[52] U.S. Cl. ................................. 525/247; 525/268; 525/323; 526/160; 502/152
[58] Field of Search ............... 525/247, 323; 526/160, 526/127

[56] References Cited

U.S. PATENT DOCUMENTS

| 4,576,994 | 3/1986 | Dorrer et al. | 525/323 |
| 4,892,851 | 1/1990 | Ewen et al. | 526/160 |
| 5,086,134 | 2/1992 | Antburg et al. | 526/126 |

FOREIGN PATENT DOCUMENTS 0135834 4/1985 European Pat. Off. .
302424 8/1987 European Pat. Off. .
0405201 1/1991 European Pat. Off. .

OTHER PUBLICATIONS

Journal of the American Chemical Society, vol. 110, "Syndiospecific Propylene Polymerizations with Group 4 Metallocenes", pp. 6255–6256, 1988.

*Primary Examiner*—Joseph L. Schofer
*Assistant Examiner*—David Wu
*Attorney, Agent, or Firm*—Connolly & Hutz

[57] ABSTRACT

A polypropylene molding composition having syndiotactic polymer chains is obtained in a high yield by the copolymerization of propylene with ethylene or a 1-olefin of the formula $R^a$—CH=CH—$R^b$ in the presence of a catalyst comprising a metallocene of the formula I

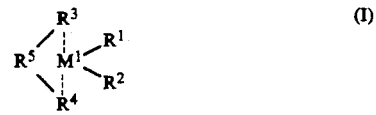

in which $M^1$ is titanium, zirconium, hafnium, vanadium, niobium or tantalum, and an aluminoxane. This molding composition has a very high molecular weight, a very narrow molecular-weight distribution and very high syndiotaxy. Shaped articles produced from the molding composition are distinguished by high transparency, flexibility, bear strength and excellent surface luster.

18 Claims, No Drawings

PROCESS FOR THE PREPARATION OF A POLYPROPYLENE MOLDING COMPOSITION

DESCRIPTION

Syndiotactic polyolefins have the advantage of good transparency, flexibility and tear strength.

The disadvantage of syndiotactic polyolefins is a glass transition temperature of above 0° C. At lower use temperatures, the polymer molding compositions exhibit brittle fracture under even low mechanical load and they lose their flexibility and tear strength completely. They are unsuitable for use, for example, in the automobile sector or for packaging deep-frozen foodstuffs.

The object was thus to discover a way of lowering the glass transition temperature of the polymers and thus to produce a product which has high impact strength and flexiblity even at low temperatures.

It has been possible to achieve this object by a polymer which comprises of a matrix of a predominantly syndiotactic polyolefin and a rubber, distributed therein in finely dispersed form, of syndiotactic polyolefin blocks, between each of which at least one further olefin is incorporated in isolation or in block form. A homopolymer can moreover also be mixed into the rubber phase.

The invention thus relates to a process for the preparation of a polypropylene molding composition comprising 1) 20 to 99% by weight, based on the total molding composition, of a polymer which comprises to the extent of 95 to 100% by weight syndiotactically arranged propylene units and to the extent of 5 to 0% by weight ethylene units or units of 1-olefins having at least 4 carbon atoms, of the formula $R^a$—CH=CH—$R^b$, in which $R^a$ and $R^b$ are identical or different and are a hydrogen atom or an alkyl radical having 1 to 10 carbon atoms, or $R^a$ and $R^b$ form a ring having 4 to 22 carbon atoms with the carbon atoms joining them (polymer 1), and 2) 1 to 80% by weight, based on the total molding composition, of a polymer which comprises to the extent of 20 to 90% by weight syndiotactically arranged propylene units and to the extent of 10 to 80% by weight ethylene units or units of 1-olefins having at least 4 carbon atoms, of the formula $R^a$—CH=CH—$R^b$, in which $R^a$ and $R^b$ have the abovementioned meaning (polymer 2), by polymerization and copolymerization of propylene in at least two stages, in solution, in suspension or in the gas phase, in the presence of a catalyst which comprises a transition metal component and an organoaluminum compound, which comprises polymerizing 20 to 99% by weight, based on the total amount of the monomers, of propylene and 0 to 5% by weight, based on the total amount of the monomers, of at least one representative of the group comprising ethylene and olefins having at least 4 carbon atoms, of the formula $R^a$—=CH—$R^b$, in which $R^a$ and $R^b$ have the abovementioned meaning, in the first stage at a temperature of −40° to 150° C. and under a pressure of 0.5 to 100 bar, and polymerizing 1 to 80% by weight, based on the total amount of the monomers, of propylene and 10 to 80% by weight, based on the total amount of the monomers, of at least one representative of the group comprising ethylene and olefins having at least 4 carbon atoms, of the formula $R^a$—= CH—$R^b$, in which $R^a$ and $R^b$ have the abovementioned meaning, in the second stage at a temperature of −40° to 150° C. and under a pressure of 0.5 to 100 bar, the catalyst comprising an aluminoxane of the formula II

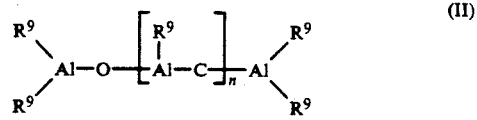

for the linear type and/or of the formula III

for the cyclic type, in which, in the formulae II and III, $R^9$ is a $C_1$-$C_6$-alkyl group or phenyl or benzyl and n is an integer from 2 to 50, and a transition metal component of the formula I

in which
$M^1$ is titanium, zirconium, hafnium, vanadium, niobium or tantalum,
$R^1$ and $R^2$ are identical or different and are a hydrogen atom, a halogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group or a $C_8$-$C_{40}$-arylalkenyl group,
$R^3$ and $R^4$ are different and are a mono- or polynuclear hydrocarbon radical, which can form a sandwich structure with the central atom $M^1$,
$R^5$ is

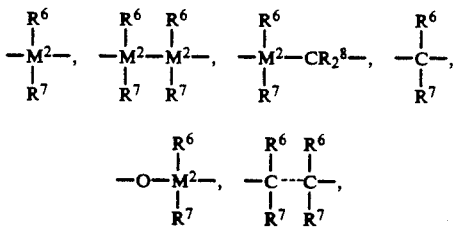

=$BR^6$, =$AlR^5$, —Ge—, —Sn—, —O—, —S—, =SO, =$SO_2$, =$NR^6$, =CO, =$PR^6$ or =P(O)$R^6$ in which $R^6$, $R^7$ and $R^8$ are identical or different and are a hydrogen atom, a halogen atom, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^6$ and $R^7$ or $R^6$ and $R^8$ form a ring, in each case with the atoms joining them, and
$M^2$ is silicon, germanium or tin.

The catalyst to be used for the process according to the invention comprises an aluminoxane and a metallocene of the formula I

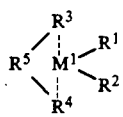
(I)

In formula I, $M^1$ is a metal from the group comprising titanium, zirconium, hafnium, vanadium, niobium and tantalum, preferably zirconium or hafnium.

$R^1$ and $R^2$ are identical or different and are a hydrogen atom, a $C_1-C_{10}$-, preferably $C_1-C_3$-alkyl group, a $C_1-C_{10}$-, preferably $C_1-C_3$-alkoxy group, a $C_6-C_{10}$-, preferably $C_6-C_8$-aryl group, a $C_6-C_{10}$-, preferably $C_6-C_8$-aryloxy group, a $C_2-C_{10}$-, preferably $C_2-C_4$-alkenyl group, a $C_7-C_{40}$-, preferably $C_7-C_{10}$-arylalkyl group, a $C_7-C_{40}$-, preferably $C_7-C_{12}$-alkylaryl group, a $C_8-C_{40}$-, preferably $C_8-C_{12}$-arylalkenyl group or a halogen atom, preferably chlorine.

$R^3$ and $R^4$ are different and are a mono- or polynuclear hydrocarbon radical which can form a sandwich structure with the central atom $M^1$.

$R^3$ and $R^4$ are preferably fluorenyl or cyclopentadienyl, it being possible for the basic structure also to carry additional substituents.

$R^5$ is a single- or multi-membered bridge which likes the radicals $R^3$ and $R^4$ and is

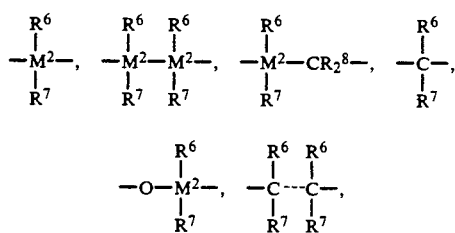

$=BR^6$, $-AlR^6$, $-Ge-$, $-Sn-$, $-O-$, $-S-$, $=SO$, $=SO_2$, $=NR^6$, $=CO$, $=PR^6$ or $=P(O)R^6$, in which $R^6$, $R^7$ and $R^8$ are identical or different and are a hydrogen atom, a halogen atom, preferably chlorine, a $C_1-C_{10}$-, preferably $C_1-C_3$-alkyl group, in particular a methyl group, a $C_1-C_{10}$-fluoroalkyl group, preferably a $CF_3$ group, a $C_6-C_{10}$-fluoroaryl group, preferably a pentafluorophenyl group, a $C_6-C_{10}$-, preferably $C_6-C_8$-aryl group, a $C_1-C_{10}$-, preferably $C_1-C_4$-alkoxy group, in particular a methoxy group, a $C_2-C_{10}$-, preferably $C_2-C_4$-alkenyl group, a $C_7-C_{40}$-, preferably $C_7-C_{10}$-arylalkyl group, a $C_8-C_{40}$-, preferably $C_8-C_{12}$-arylalkenyl group or a $C_7-C_{40}$-, preferably $C_7-C_{12}$-alkylaryl group, or $R^6$ and $R^7$ or $R^6$ and $R^8$ form a ring, in each case together with the atoms joining them.

$M^2$ is silicon, germanium or tin, preferably silicon or germanium.

$R^5$ is preferably $=CR^6R^7$, $=SiR^6R^7$, $=GeR^6R^7$, $-O-$, $-S-$, $=SO$, $=PR^6$ or $=P(O)R^6$.

The metallocenes described can be prepared in accordance with the following general equations:

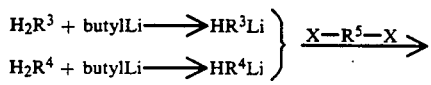

-continued

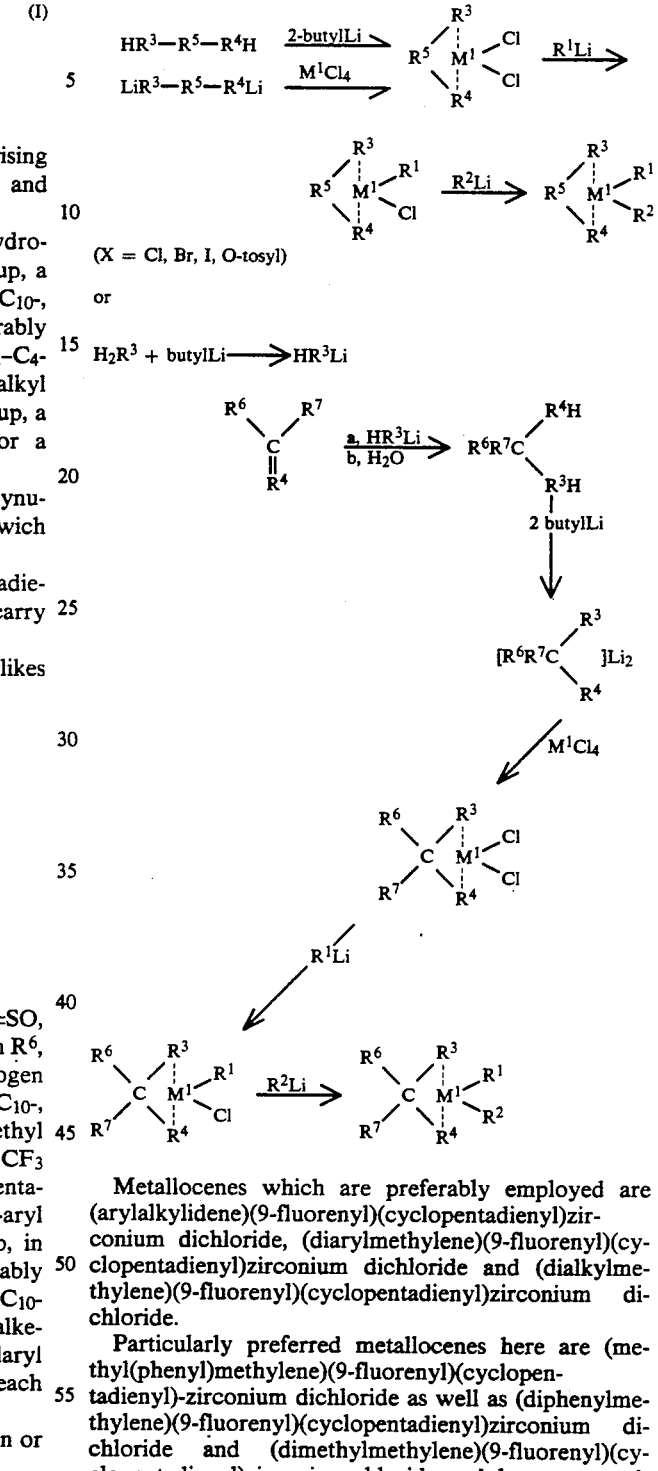

($X = Cl, Br, I, O-tosyl$)

or $H_2R^3 + butylLi \longrightarrow HR^3Li$

Metallocenes which are preferably employed are (arylalkylidene)(9-fluorenyl)(cyclopentadienyl)zirconium dichloride, (diarylmethylene)(9-fluorenyl)(cyclopentadienyl)zirconium dichloride and (dialkylmethylene)(9-fluorenyl)(cyclopentadienyl)zirconium dichloride.

Particularly preferred metallocenes here are (methyl(phenyl)methylene)(9-fluorenyl)(cyclopentadienyl)-zirconium dichloride as well as (diphenylmethylene)(9-fluorenyl)(cyclopentadienyl)zirconium dichloride and (dimethylmethylene)(9-fluorenyl)(cyclopentadienyl)zirconium chloride, and the corresponding hafnium analogs.

The cocatalyst is an aluminoxane of the formula II

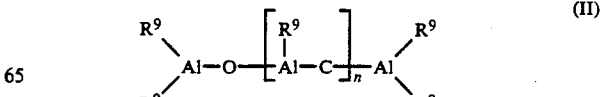
(II)

for the linear type and/or of the formula III

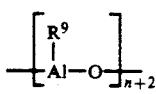

$$\left[\begin{array}{c} R^9 \\ | \\ Al-O \end{array}\right]_{n+2} \quad (III)$$

for the cyclic type. In these formulae, $R^9$ is a $C_1$–$C_6$alkyl group, preferably methyl, ethyl or isobutyl, butyl or neopentyl, or phenyl or benzyl. Methyl is particularly preferred. n is an integer from 2 to 50, preferably 5 to 40. However, the precise structure of the aluminoxane is not known.

The aluminoxane can be prepared in various ways.

One possibility is the careful addition of water to a dilute solution of an aluminum trialkyl by introducing in each case small portions of the solution of the aluminum trialkyl, preferably aluminum trimethyl, and the water into an initial larger amount of an inert solvent and in each case awaiting the end of the evolution of gas in between additions.

In another process, finely powdered copper sulfate pentahydrate is suspended in toluene, and, in a glass flask aluminum trialkyl is added under an inert gas at about $-20°$ C. in an amount such that about 1 mol of $CuSO_4 \cdot 5H_2O$ is available for every 4 Al atoms. After slow hydrolysis with alkane being split off, the reaction mixture is left to stand at room temperature for 24 to 48 hours, during which it must be cooled if appropriate, so that the temperature does not rise above 30° C. The aluminoxane dissolved in the toluene is then filtered off from the copper sulfate and the solution is concentrated in vacuo. It is assumed that in this preparation process the low molecular weight aluminoxanes undergo condensation to higher oligomers, aluminum trialkyl being split off.

Aluminoxanes are furthermore obtained if aluminum trialkyl, preferably aluminum trimethyl, dissolved in an inert aliphatic or aromatic solvent, preferably heptane or toluene, is reacted with aluminum salts containing water of crystallization, preferably aluminum sulfate, at a temperature of $-20°$ to 100° C. The volume ratio between the solvent and the aluminum alkyl used in this reaction is 1:1 to 50:1, preferably 5:1, and the reaction time, which can be checked by measuring the splitting off of the alkane, is 1 to 200 hours, preferably 10 to 40 hours.

Of the aluminum salts containing water of crystallization, those which have a high content of water of crystallization are used in particular. Aluminum sulfate hydrate, above all the compounds $Al_2(SO_4)_3 \cdot 16H_2O$ and $Al_2(SO_4)_3 \cdot 18H_2O$ with the particularly high water-of-crystallization contents of 16 and 18 mol of $H_2O$/mol of $Al_2(SO_4)_3$ respectively, is particularly preferred.

Another variant for the preparation of aluminoxanes comprises dissolving aluminum trialkyl, preferably aluminum trimethyl, in the suspending agent which has been initially introduced into the polymerization kettle, preferably in the liquid monomer, in heptane or toluene, and then reacting the aluminum compound with water.

In addition to the processes described above for the preparation of aluminoxanes, there are others which can be used. All aluminoxane solutions have the common feature of a varying content of unreacted aluminum trialkyl, which is present in the free form or as an adduct, regardless of the preparation method. This content has an influence on the catalytic activity which has not yet been explained precisely and which varies according to the metallocene compound employed.

It is possible for the metallocene to be preactivated with an aluminoxane of the formula II and/or III before use in the polymerization reaction. This significantly increases the polymerization activity and improves the grain morphology.

The preactivation of the transition metal compound is carried out in solution. In this preactivation, the metallocene is preferably dissolved in a solution of the aluminoxane in an inert hydrocarbon. An aliphatic or aromatic hydrocarbon is a suitable inert hydrocarbon. Toluene is preferably used.

The concentration of the aluminoxane in the solution is in the range from about 1% by weight up to the saturation limit, preferably from 5 to 30% by weight, in each case based on the total solution. The metallocene can be employed in the same concentration, but is preferably employed in an amount of $10^{-4}1$ mol per mol of aluminoxane. The preactivation time is 5 minutes to 60 hours, preferably 5 to 60 minutes. The preactivation is carried out at a temperature of $-78°$ C. to 100° C., preferably 0° to 70° C.

A significantly longer preactivation time is possible, but usually has neither an activity-increasing nor an activity-reducing effect, although it may be entirely appropriate for storage purposes.

The polymerization is carried out in a known manner in solution, in suspension or in the gas phase, continuously or discontinuously in two or more stages at a temperature of $-40°$ to 150° C., preferably $-30°$ to 100° C., in particular 0° to 80° C.

The total pressure in the polymerization system is 0.5 to 100 bar. Polymerization in the pressure range of 5 to 60 bar, which is of particular industrial interest, is preferred. Monomers having a boiling point above the polymerization temperature are preferably polymerized under normal pressure.

In the first stage, a polymer 1 is prepared by polymerization of 95 to 100, preferably 98 to 100% by weight of propylene and 5 to 0, preferably 2 to 0% by weight of ethylene or a 1-olefin having at least 4 carbon atoms, of the formula $R^a$—CH=CH—$R^b$. In this formula, $R^a$ and $R^b$ are identical or different and are a hydrogen atom or an alkyl radical having 1 to 10 carbon atoms, or $R^a$ and $R^b$ form a ring having 4 to 22 carbon atoms with the atoms joining them. Examples of such 1-olefins are 1-butene, 1-hexene, 4-methyl-1-pentene, 1-octene and norbornene. Ethylene, 1-butene and 4-methyl-1-pentene are preferred.

The pressure in the first stage is 0.5 to 100, preferably 5 to 60 bar. The temperature is in the range from $-40°$ to 150°, preferably $-30°$ to 100° C.

20 to 99, preferably 50 to 95% by weight, based on the total amount of polymer 1 and polymer 2, of polymer 1 is formed in the first stage. This polymer 1 comprises syndiotactically arranged propylene units between which units of comonomers are positioned. The content of propylene units is 100 to 95, preferably 100 to 98% by weight and the content of other monomer units is 0 to 5, preferably 0 to 2% by weight.

The polymer 2 is then prepared in the second stage by polymerization of 20 to 90% by weight of propylene and 10 to 89, preferably 15 to 70% by weight of ethylene or a 1-olefin having at least 4 carbon atoms, of the formula $R^a$—CH=CH—$R^b$, in which $R^a$ and $R^b$ have the meaning already given. Ethylene, 1-butene and 4-methyl-1-pentene are again preferred as comonomers.

The pressure in the second stage is 0.5 to 100, preferably 5 to 60 bar. The temperature is in the range from −40° to 150°, preferably −30° to 100° C.

1 to 80, preferably 5 to 60% by weight, based on the total amount of polymer 1 and polymer 2, of polymer 2 are formed in the second stage. The polymer 2 likewise comprises syndiotactically arranged propylene units, between which units of comonomers are positioned. The content of propylene units is 20 to 90, preferably 30 to 85% by weight and the content of other monomer units is 10 to 80, preferably 15 to 70% by weight.

Hydrogen can be used as a molecular weight regulator.

As a result of the process according to the invention, it is possible for comonomers in this second part of the polymerization not only to be incorporated into the syndiotactic polypropylene chain but also to form pure homopolymer chains.

The metallocene compound is used in the polymerization in a concentration, based on the transition metal, of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-5}$ to $10^{-1}$ mol, preferably $10^{-5}$ to $10^{-2}$ mol per $dm^3$ of solvent or per $dm^3$ of reactor volume. In principle, however, higher concentrations are also possible.

If the polymerization is carried out as suspension or solution polymerization, an inert solvent which is customary for the Ziegler low pressure process is used. For example, the polymerization is carried out in an aliphatic or cycloaliphatic hydrocarbon; butane, pentane, hexane, heptane, isooctane, cyclohexane and methylcyclohexane may be mentioned as examples of such hydrocarbons.

A gasoline or hydrogenated diesel oil fraction can furthermore be used. Toluene can also be employed. The polymerization is preferably carried out in the liquid monomer or in the gas phase.

If an inert solvent is used, the monomers are metered into the reactor in gaseous or liquid form. If a monomer is used as a suspending agent, the comonomer or comonomers therefore are metered in gaseous or liquid form. It is furthermore possible to carry out the polymerization in a mixture of various monomers as the suspending agent, and a further monomer can then be metered in liquid or gaseous form. The composition of the copolymer product is controlled by the polymerization times of polymers 1 and 2. The polymerization can be of any desired total duration, since the catalyst system to be used according to the invention displays only a slight time-dependent drop in polymerization activity.

A molding composition which, after processing in extruders, kneaders or other machines used according to the prior art, can be processed to shaped articles made of plastic which are distinguished by a high impact strength and flexibility, even at relatively low use temperatures, can be prepared by means of the process according to the invention.

The following examples are intended to illustrate the invention.

The properties of the polymers prepared according to the following examples were determined specifically by the following methods:

The melt flow index was measured in accordance with DIN 53 735 and has been stated in $dg.min^{-1}$.

The viscosity number VN of the polymers was determined on 0.1% strength by weight solutions in decahydronaphthalene (isomer mixture) at 135° C. in a capillary viscometer and has been stated in $cm^3/g$.

The ball indentation hardnesses were measured in accordance with DIN 53 456 on pressed sheets which had been annealed at 120° C. under $N_2$ for 3 hours, cooled in the course of 3 hours and stored in a climatically controlled chamber at 23° C. and 50% relative atmospheric humidity for 24 hours for temperature adjustment.

The flexural impact test on a standard small bar having a V notch (flank angle 45°, notch depth 1.3 mm, notch radius 1 mm) was used to determine the mechanical properties. The test specimens were taken from pressed sheets which had been stored at 23° C. and 50% relative atmospheric humidity for 24 hours after production.

The composition of the product was determined by $^{13}C$-NMR spectroscopy. In this analysis:

$n_{PP}$ is the average block length of polypropylene
$n_{PE}$ is the average block length of polyethylene
$n_{syn}$ is the average syndiotactic block length
SI is the syndiotactic index (SI=rr+½mr)

Furthermore:

VN is the viscosity number in $cm^3/g$
$M_w$ is the weight average molecular weight in g/mol
$M_w/M_n$ is the polydispersivity The molecular weights were determined by gel permeation chromatography and the melting points, crystallization points and glass transition temperatures were measured by DSC.

The products were fractionated by dissolving in decane at 100° C. and fractionated precipitation with acetone at room temperature. The $C_2$ contents of the fractions were determined by IR spectroscopy.

All the following working operations of the metallocene syntheses were carried out under an inert gas atmosphere using absolute solvents.

Diphenylmethylene(9-fluorenyl)(cyclopentadienyl)-zirconium dichloride

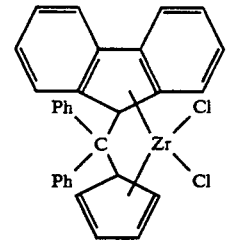

12.3 $cm^3$ (30.7 mmol) of a 2.5 molar solution of n-butyllithium in hexane were slowly added to a solution of 5.10 g (30.7 mmol) of fluorene in 60 $cm^3$ of tetrahydrofuran at room temperature. After 40 minutes, 7.07 g (30.7 mmol) of diphenylfulvene were added to the orange solution and the mixture was stirred overnight. 60 $cm^3$ of water were added to the dark red solution, whereupon the solution became yellow in color, and the solution was extracted with ether. The ether phase was dried over $MgSO_4$ and concentrated and the concentrate was left to crystallize at −35° C. 5.1 g (42%) of 1,1-cyclopentadienyl-(9-fluorenyl)diphenylmethane were obtained as a beige powder.

2.0 g (5.0 mmol) of the compound were dissolved in 20 $cm^3$ of tetrahydrofuran, and 6.4 $cm^3$ (10 mmol) of a 1.6 molar solution of butyllithium in hexane were added at 0° C. After the mixture had been stirred at room temperature for 15 minutes, the solvent was stripped off and the red residue was dried under an oil pump vacuum and washed several times with hexane. After drying under an oil pump vacuum, the red powder was added to a suspension of 1.16 g (5.00 mmol) of ZrCl$_4$ at −78° C. After the mixture had warmed up slowly, it was stirred at room temperature for a further 2 hours. The pink-colored suspension was filtered over a G3 frit. The pink-red residue was washed with 20 cm$^3$ of CH$_2$Cl$_2$, dried under an oil pump vacuum and extracted with 120 cm$^3$ of toluene. After the solvent had been stripped off and the residue had been dried under an oil pump vacuum, 0.55 g of the zirconium complex was obtained in the form of a pink-red crystalline powder.

The orange-red filtrate of the reaction mixture was concentrated and the concentrate was left to crystallize at −35° C. A further 0.45 g of the complex crystallize out of CH$_2$Cl$_2$. Total yield 1.0 g (36%). Correct elemental analyses. The mass spectrum showed M+ =556. $^1$H-NMR spectrum (100 MHz, CDCl$_3$); 6.90–8.25 (m, 16, Flu-H, Ph-H), 6.40 (m, 2, Ph-H), 6.37 (t, 2, Cp-H), 5.80 (t, 2, Cp-H).

The metallocene dimethylmethylene(9-fluorenyl)(cyclopentadienyl)zirconium dichloride was prepared in accordance with the literature reference J. Am. Chem. Soc. 110 (1988) 6255.

(Phenyl(methyl)methylene)(9-fluorenyl)(cyclopentadienyl)hafnium dichloride

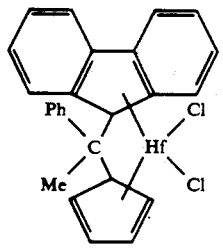

A solution of 67.8 mmol of lithium-fluorene in 50 cm$^3$ of tetrahydrofuran was added to a solution of 11.4 g (67.8 mmol) of 6-methyl-6-phenyl-fulvene in 40 cm$^3$ of tetrahydrofuran at room temperature. After the mixture had been stirred at room temperature for 2 hours, 60 cm$^3$ of water were added. The substance obtained after this addition was filtered off with suction, washed with diethyl ether and dried under an oil pump vacuum. 19.1 g (84.2%) of 2,2-cyclopentadienyl(9-fluorenyl)ethylbenzene were obtained (correct elemental analyses; $^1$H-NMR spectrum).

10.0 g (19.9 mmol) of the compound were dissolved in 60 cm$^3$ of tetrahydrofuran, and 26 cm$^3$ (65 mmol) of a 2.5 molar solution of n-butyllithium in hexane were added at 0° C. After the mixture had been stirred for 15 minutes, the solvent was stripped off in vacuo. The dark red residue which remained was washed several times with hexane and dried under an oil pump vacuum. 15.6 g of the red dilithium salt were obtained as a tetrahydrofuran adduct; this contained about 30% of tetrahydrofuran.

A suspension of 4.78 g (14.9 mmol) of HfCl$_4$ in 70 cm$^3$ of CH$_2$Cl$_2$ was reacted with 14.9 mmol of the dilithium salt and the mixture was worked up. Crystallization at −35° C. gave 2.6 g (30%) of the hafnocene dichloride compound as crystals. Correct elemental analysis.

$^1$H-NMR spectrum (100 MHz, CDCl$_3$): 7.17–8.20 (m, 11 Flu-H, Ph-H), 6.87 (m, 1, Ph-H), 6.12–6.42 (m, 3, Ph-H, Cp-H), 5.82, 5.67 (2xdd, 2xl, Cp-H), 2.52 (s, 3, CH$_3$).

EXAMPLE 1

A dry 16 dm$^3$ reactor was flushed with nitrogen and filled with 10 dm$^3$ of liquid propylene. 30 cm$^3$ of a toluene solution of methylaluminoxane (corresponding to 40 mmol of Al, average degree of oligomerization of the methylaluminoxane of 20) were then added and the mixture was stirred at 30° C. for 15 minutes.

In parallel with this, 10.4 mg (0.024 mmol) of dimethylmethylene(9-fluorenyl)(cyclopentadienyl)zirconium dichloride were dissolved in 15 cm$^3$ of a toluene solution of methylaluminoxane (20 mmol of Al) and were preactivated by being left to stand for 15 minutes, and the mixture was then added to the kettle. Polymerization was first carried out at a polymerization temperature of 70° C. for 30 minutes (1st stage, polymer 1) and the polymerization temperature was then lowered to 50° C. An absolute pressure of 31 bar was established by forcing in ethylene. This pressure was kept constant during the polymerization of 30 minutes by topping up with ethylene (2nd stage, polymer 2). 0.75 kg of polymer having a melt flow index ( 230/5 of 135 dg min$^{-1}$ and a VN of 83 cm$^3$/g was obtained. The ethylene content of the polymer was 17.4% by weight. Melting point = 124°/134° C. Crystallization point = 84° C., glass transition temperature = −59.5° C. and 3.7° C. (two glass transitions, of which the higher value can be assigned to the syndiotactic homopolymer matrix (polymer 1) and the lower value can be assigned to the syndiotactic copolymer rubber (polymer 2)). The syndiotactic index of the polypropylene content was 94.7%. The ethylene was incorporated in the polymer 2 in isolation ($n_{PE}$=1) to the extent of 35.4%, with $n_{PE}$=2 to the extent of 8.3% and in block form ($n_{PE} \geq 3$) to the extent of 65.3%, and the polypropylene blocks were built up syndiotactically.

EXAMPLE 2

The procedure was as in Example 1, but the polymerization times in stages 1 and 2 were in each case 50 minutes and the absolute pressure in the 2nd stage was adjusted to and kept at 33 bar with ethylene. 1.20 kg of polymer having a melt flow index 230/5 of 203 dg min$^{-1}$, a ball indentation hardness of 19 N mm$^{-2}$ and a VN of 68 cm$^3$/g were obtained The ethylene content of the polymer was 11.6% by weight. Melting point 133° C., crystallization point 101° C., glass transition temperature = −55.4° C. and 4.0° C. (two glass transitions, of which the higher value can be assigned to the syndiotactic homopolymer matrix (polymer 1) and the lower value can be assigned to the syndiotactic copolymer rubber (polymer 2)). The syndiotactic index of the polypropylene content was 94.8%, corresponding to $n_{syn}$=30. The notched impact strength at −40° C. was 2.2 mJ mm$^{-2}$.

EXAMPLE 3

The procedure was as in Example 1, but 41.9 mg (0.072 mmol) of (phenyl(methyl)methylene)(9-fluorenyl)(cyclopentadienyl)hafnium dichloride was employed as the metallocene. The temperature of the 1st stage was 50° C., the hydrogen partial pressure was 0.25 bar and the polymerization time was 4 hours. Polymerization was carried out in the 2nd stage at 60° C. for 2 hours. An absolute pressure of 38 bar was established and maintained with ethylene. 1.12 kg of polymer having a melt flow index 230/5 of 0.5 dg.min$^{-1}$ and a VN of 591 cm$^3$/g were obtained. The ethylene content of the polymer was 11.5% by weight. Melting point 120° C., crystallization point=81° C., glass transition temperature=−39.3° C. and 4.0° C. (two glass transitions, of which the higher value can be assigned to the syndiotactic homopolymer matrix (polymer 1) and the lower value can be assigned to the syndiotactic copolymer rubber (polymer 2)). The syndiotactic index of the polypropylene content was 97.1%, corresponding to $n_{syn}$=41. Notched impact strength at 0° C. 21.9 mJ mm$^{-2}$, at −20° C. 16.2 mJ mm$^2$ and at −40° C. 8.5 mJ mm$^{-2}$; no fracture at +23° C.

EXAMPLE 4

The procedure was as in Example 1, but 18.2 mg (0.033 mmol) of diphenylmethylene(9-fluorenyl)(cyclopentadienyl)zirconium dichloride were employed as the metallocene. The temperature of the 1st stage was 60° C. and the polymerization time was 60 minutes. The polymerization was carried out at 50° C. for 22 minutes in the 2nd stage, during which an absolute pressure of 25 bar was established and maintained throughout the polymerization time with ethylene. 0.92 kg of polymer having a melt flow index (230/5) of 0.4 dg.min$^{-1}$, a ball indentation hardness of 19 N.mm$^{-2}$ and a VN of 372 cm$^3$/g was obtained. The ethylene content of the polymer was 3.6% by weight. Melting point 134° C., crystallization point 98° C., glass transition temperature=−44.3° C. and 1.8° C. (two glass transitions, of which the higher value can be assigned to the syndiotactic homopolymer matrix (polymer 1) and the lower value can be assigned to the syndiotactic copolymer rubber (polymer 2)). Fractionation of the polymer resulted in a copolymer rubber containing 18.3% by weight of C$_2$. The syndiotactic index of the polypropylene content was 95.8%. Notched impact strength at 0° C. 19.3 mJ mm$^{-2}$, at −20° C. 13.9 mJ mm$^2$ and at −40° C. 5.1 mJ mm$^{-2}$; no fracture at −23° C.

EXAMPLE 5

The procedure was as in Example 4, but the polymerization times in the 1st and 2nd stages were in each case 3 hours. The absolute pressure in the 2nd stage was adjusted to and kept at 23 bar with ethylene. 2.34 kg of polymer having a melt flow index 230/5 of 2.2 dg.min$^{-1}$ and a VN of 260 cm$^3$/g were obtained.

Melting point 128° C., crystallization point 87° C., glass transition temperature=−28.9° C. and 2.4° C. (two glass transitions, of which the higher value can be assigned to the syndiotactic homopolymer matrix (polymer 1) and the lower value can be assigned to the syndiotactic copolymer rubber (polymer 2)). Notched impact strength at −40° C. 8.9 mJ mm$^{-2}$; no fracture at 0° C. and +23° C. Fractionation of the polymer resulted in 46.9% by weight of syndiotactic homopolymer (polymer 1) having a VN of 340 cm$^3$/g, a syndiotactic index of 95.1%, an $M_w$ of 485,000 and an $M_w/M_n$ of 2.1, and 53.1% by weight of a propylene-ethylene copolymer (polymer 2) having a VN of 189 cm$^3$/g and a C$_2$ content of 21% by weight.

EXAMPLE 6

The procedure was as in Example 4, but 12.2 mg (0.02 mmol) of the metallocene were used. The polymerization was carried out at 40° C. for 30 minutes in the 2nd stage, the absolute pressure being adjusted to and kept at 27 bar with ethylene. 0.70 kg of polymer having a melt flow index 230/5 of 0.1 dg.min$^{-1}$ and a VN of 436 cm$^3$/g was obtained.

The ethylene content of the polymer was 6.9% by weight. Melting point=135° C., crystallization point 99° C., glass transition temperature=−49.0° C. and 3.2° C. (two glass transitions, of which the higher value can be assigned to the syndiotactic homopolymer matrix (polymer 1) and the lower value can be assigned to the syndiotactic copolymer rubber (polymer 2). The syndiotactic index of the polypropylene content was 96.8%. The copolymer rubber obtained from the fractionation contained 18.5% by weight of ethylene units.

Comparison Examples A–F

A dry 16 dm$^3$ reactor was flushed with nitrogen and filled with 10 dm$^3$ of liquid propylene. 30 cm$^3$ of a toluene solution of methylaluminoxane (40 mmol of Al) were then added and the mixture was stirred for 15 minutes. In parallel with this, one of the metallocenes mentioned below, which are capable of linking propylene to give syndiotactic polypropylene, was dissolved in 15 cm$^3$ of a toluene solution of methylaluminoxane (20 mmol of Al), and after 15 minutes the solution was added to the reactor. Polymerization was carried out at the polymerization temperature stated in the table. The glass transition temperatures of the syndiotactic homopolymers thus obtained were measured. The notched impact strengths measured at 0° C. were in the range from 1.9 to 2.5 mJ mm$^{-2}$.

| Comparison Example | Metallocene | mg | Polymerization temperature [°C.] | Glass transition temperature $T_g$ [°C.] |
|---|---|---|---|---|
| A | Dimethylmethyl-(9-fluorenyl)- | 10.3 | 70 | 4.5 |
| B | (cyclopentadienyl)zirconium dichloride | 13.9 | 60 | 3.5 |
| C | Diphenylmethylene-(9-fluorenyl)(cyclo- | 12.4 | 70 | 2.8 |
| D | pentadienyl)zirconium dichloride | 11.9 | 60 | 3.2 |
| E | (Phenyl(methyl)methylene)(9-fluorenyl) | 53.0 | 60 | 3.0 |
| F | (cyclopentadienyl)-hafnium dichloride | 64.4 | 50 | 3.8 |

The comparison examples document the glass transition temperatures lie exclusively and significantly above 0° C. The polymers thus prepared exhibit brittle fracture at temperatures below 0° C. and have completely lost their flexibility. In contrast, the molding compositions according to the invention still have a high flexibility and toughness, which is to be attributed to the glass transition temperature of the polymer component 2, which lies significantly below 0° C.

We claim:

1. A process for the preparation of a polypropylene molding composition comprising
   1) 20 to 99% by weight, based on the total molding composition, of a polymer which comprises to the extent of 95 to 100% by weight syndiotactically arranged propylene units and to the extent of 5 to 0% by weight ethylene units or units of 1-olefins having at least 4 carbon atoms, of the formula $R^a-=CH-R^b$, in which $R^a$ and $R^b$ are identical or different and are a hydrogen atom or an alkyl radical having 1 to 10 carbon atoms, or $R^a$ and $R^b$ form a ring having 4 to 22 carbon atoms with the carbon atoms joining them (polymer 1), and 2) 1 to 80% by weight, based on the total molding composition, of a polymer which comprises to the extent of 20 to 90% by weight syndiotactically arranged propylene units and to the extent of 10 to 80% by weight ethylene units or units of 1-olefins having at least 4 carbon atoms, of the formula $R^a-CH=CH-R^b$, in which $R^a$ and $R^b$ have the above-mentioned meaning (polymer 2), by polymerization and copolymerization of propylene in at least two stages, in solution, in suspension or in the gas phase, in the presence of a catalyst which comprises a transition metal component and an organoaluminum compound, which comprises polymerizing 20 to 99% by weight, based on the total amount of the monomers, of propylene and 0 to 5% by weight, based on the total amount of the monomers, of at least one representative of the group comprising ethylene and olefins having at least 4 carbon atoms, of the formula $R^a-CH=CH-R^b$, in which $R^a R^b$ have the abovementioned meaning, in the first stage at a temperature of $-40°$ to $150°$ C. and under a pressure of 0.5 to 100 bar, and polymerizing 1 to 80% by weight, based on the total amount of the monomers, of propylene and 10 to 80% by weight, based on the total amount of the monomers, of at least one representative of the group comprising ethylene and olefins having at least 4 carbon atoms, of the formula $R^a-CH=CH-R^b$, in which $R^a$ and $R^b$ have the abovementioned meaning, in the second stage at a temperature of $-40°$ to $150°$ C. and under a pressure of 0.5 to 100 bar, the catalyst comprising an aluminoxane of the formula II

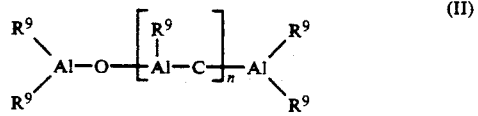

for the linear type and/or of the formula III

for the cyclic type, in which, in the formulae II and III, $R^9$ is a $C_1-C_6$-alkyl group or phenyl or benzyl and n is an integer from 2 to 50, and a transition metal component of the formula I

in which $M^1$ is titanium, zirconium, hafnium, vanadium, niobium or tantalum, $R^1$ and $R^2$ are identical or different and are a hydrogen atom, a halogen atom, a $C_1-C_{10}$-alkyl group, a $C_1-C_{10}$-alkoxy group, a $C_6-C_{10}$-aryl group, a $C_6-C_{10}$-aryloxy group, a $C_2-C_{10}$-alkenyl group, a $C_7-C_{40}$-arylalkyl group, a $C_7-C_{40}$-alkylarl group or a $C_8-C_{40}$-arylalkenyl group, $R^3$ and $R^4$ are different and are a mono- or polynuclear hydrocarbon radical, which can form a sandwich structure with the central atom $M^1$, $R^5$ is

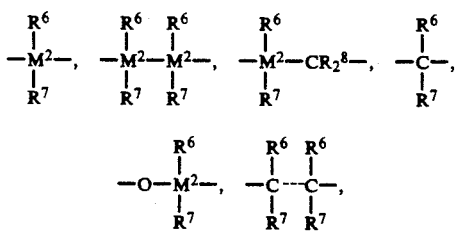

$=BR^6$, $AlR^6$, $-Ge-$, $-Sn-$, $-O-$, $-S-$, $=SO$, $=SO_2$, $=NR^6$, $=CO$, $=PR^6$ or $=P(O)R^6$ in which $R^6$, $R^7$ and $R^8$ are identical or different and are a hydrogen atom, a halogen atom, a $C_1-C_{10}$-alkyl group, a $C_1-C_{10}$-fluoroalkyl group, a $C_6-C_{10}$-fluoroaryl group, a $C_6-C_{10}$-aryl group, a $C_1-C_{10}$-alkoxy group, a $C_2-C_{10}$-alkenyl group, a $C_7-C_{40}$-arylalkyl group, a $C_8-C_{40}$-arylalkenyl group or a $C_7-C_{40}$alkylaryl group, or $R^6$ and $R^7$ or $R^6$ and $R^8$ form a ring, in each case with the atoms joining them, and $M^2$ is silicon, germanium or tin.

2. A process as claimed in claim 1, wherein $M^2$ is silicon or germanium.

3. The process as claimed in claim 1, wherein $R^5$ is selected from the group consisting of $=CR^6R^7$, $=SiR^6R^7$, $=GeR^6R^7$, $-O-$, $-S-$, $=SO$, $=PR^6$ and $=P(O)R^6$.

4. The process as claimed in claim 1, wherein the metallocene of formula I is selected from the group consisting of (arylalkylidene)(9-fluorenyl)(cyclopentadienyl)zirconium dichloride, (diarylmethylene)(9-fluorenyl)(cyclopentadienyl)zirconium chloride and (dialkylmethylene)(9-fluorenyl)(cyclopentadienyl)zirconium dichloride.

5. The process as claimed in claim 1, wherein metallocene of formula I is selected from the group consisting of (methyl-(phenyl)methylene)(9-fluorenyl)(cyclopentadienyl)zirconium dichloride, (diphenylmethylene)(9-fluorenyl)(cyclopentadienyl)zirconium dichloride, (dimethylmethylene)(9-fluorenyl)(cyclopentadienyl)-zirconium chloride, and the corresponding hafnium analogs.

6. The process as claimed in claim 1, wherein the n is an integer from 5 to 40.

7. The process as claimed in claim 1, wherein $R^3$ and $R^4$ are fluorenyl or cyclopentadienyl.

8. The process as claimed in claim 1, wherein $M^1$ is zirconium or hafnium.

9. The process as claimed in claim 1, wherein $R^1$ and $R^2$ are a $C_1-C_3$-alkyl group, a $C_1-C_3$-alkoxy group, a $C_6-C_8$-aryl group, $C_6-C_8$-aryloxy group, $C_2-C_4$alkenyl group, a $C_7-C_{10}$-arylalkyl group, a $C_7-C_{12}$-alkylaryl group, a $C_8-C_{12}$-arylalkenyl group, or a chlorine.

10. A process as claimed in claim 1, wherein $R^6$, $R^7$ and $R^8$ are identical or different and are a chlorine, a $C_1-C_3$-alkyl group, a $CF_3$ group, a pentafluorophenyl group, a $C_6$–$C_8$-aryl group, a $C_1$–$C_4$-alkoxy group, a $C_2$–$C_4$-alkenyl group, a $C_7$–$C_{10}$ alkylaryl group, a $C_8$–$C_{12}$-alkylalkenyl group, and a $C_7$–$C_{12}$-alkylaryl group.

11. A process as claimed in claim 1, wherein $R^6$, and $R^7$ and $R^8$ are identical or different and are a methyl group or a methoxy group.

12. A process as claimed in claim 1, wherein the pressure in the first stage is from 5 to 60 bar.

13. The process as claimed in claim 1, wherein the pressure in the second stage is 5 to 60 bar and the temperature is from −30° to 100° C.

14. The process as claimed in claim 1, is prepared by polymerization of 98-100% by weight of propylene.

15. The process as claimed in claim 1, wherein 50-95% by weight from a total amount of polymer 1, polymer 2, of polymer 1 is formed in the first stage.

16. The process as claimed in claim 1, wherein 5-60% by weight based on the total amount of polymer 1 and polymer 2, of polymer 2 are formed in the second stage.

17. The process as claimed in claim 1, wherein polymer 2 comprises 30-85% by weight content of propylene units.

18. A process as claimed in claim 1, wherein the ethylene or 4-carbon olefin in polymer 2 is incorporated in isolation.

* * * * *

UNITED STATES PATENT AND TRADEMARK OFFICE
CERTIFICATE OF CORRECTION

PATENT NO. : 5,232,993
DATED : Aug. 3, 1993
INVENTOR(S) : Winter, et al

It is certified that error appears in the above-indentified patent and that said Letters Patent is hereby corrected as shown below:

In the Abstract, line 7, please delete the word "riobium" and insert --niobium-- therefor.

In column 2, lines 5-10, please correct the formula to read

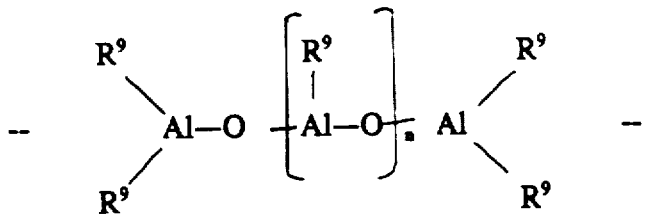

In column 3, line 27, please correct the spelling of "likes" to read --links--.

In column 4, line 58, please correct the spelling of "zirconium chloride" to read --zirconium dichloride-- therefor.

UNITED STATES PATENT AND TRADEMARK OFFICE
CERTIFICATE OF CORRECTION

PATENT NO. : 5,232,993  
DATED : Aug. 3, 1993  
INVENTOR(S) : Winter, et al

Page 2 of 3

It is certified that error appears in the above-indentified patent and that said Letters Patent is hereby corrected as shown below:

In column 4, lines 61-54, please correct the formula to read

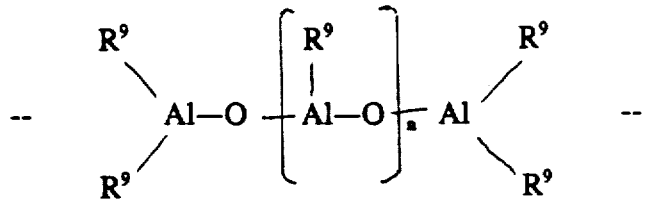

In column 6, line 17, please correct the phrase "$10^{-4}$ 1 mol" to read --$10^{-4}$ -1 mol--.

In column 12, line 42, please correct the spelling of "Dimethylmethyl" to read --Dimethylmethylene-- therefor.

In column 13, line 5, please correct the formula to read

--$R^a$-CH=CH-$R^b$--.

UNITED STATES PATENT AND TRADEMARK OFFICE
CERTIFICATE OF CORRECTION

PATENT NO. : 5,232,993
DATED : Aug. 3, 1993
INVENTOR(S) : Winter, et al

It is certified that error appears in the above-indentified patent and that said Letters Patent is hereby corrected as shown below:

In column 13, lines 41-45, please correct the formula to read

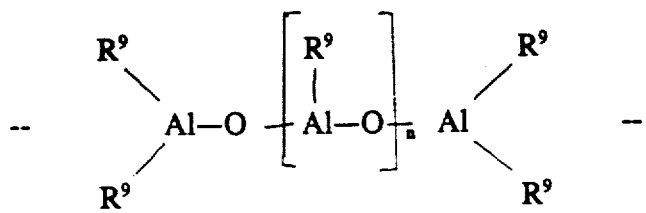

In column 14, line 44, please correct the spelling of "chloride" to read --dichloride--.

In column 14, line 53, please correct the spelling of "chloride" to read --dichloride--.

In column 16, lines 1 and 2, please delete the phrase "is prepared by polymerization" and insert the correct phrase --wherein the molding composition comprises-- therefor.

In column 16, lines 4 and 5, the phrase "polymer 1, polymer 2" should correctly read --polymer 1 and polymer 2--.

Signed and Sealed this

Twenty-fourth Day of May, 1994

Attest:

BRUCE LEHMAN

*Attesting Officer*  *Commissioner of Patents and Trademarks*